Peter Faber
INVENTOR.

//patent_no: 3,436,267
//patented: Apr. 1, 1969

3,436,267
PROCESS FOR THE PRODUCTION OF ELECTRICALLY ACTIVE HIGH-VALENT NICKEL COMPOUNDS
Peter Faber, Kahl am Main, Germany, assignor to Rheinisch-Westfalisches Elektrizitatswerk Aktiengesellschaft, Essen, Germany, a corporation of Germany
Filed Oct. 23, 1965, Ser. No. 504,263
Claims priority, application Germany, Mar. 24, 1965, R 40,191
Int. Cl. H01m 43/04
U.S. Cl. 136—29                                  8 Claims

ABSTRACT OF THE DISCLOSURE

A method of making a nickel hydroxide with the apparent formula NiOOH and a higher valent state than nickel-II hydroxide, especially for use as the active material of an electrode for an alkaline accumulator, wherein the dry nickel-II hydroxide is treated, preferably in an agitated condition or a gas vortex, with ozone in a gas stream at a temperature of 20° C. to 110° C. until the nickel-II hydroxide is converted into a black mass of the higher-valent state compound.

---

The present invention relates to a process for the preparation of nickel-III hydroxide for use in alkaline storage cells.

As is known, in new, improved versions of alkaline storage cells, the electrodes are constructed of highly porous active materials on or in electrode grids serving as mechanical supports for preventing deformation of the electrode and as current collectors. Particularly good results have been obtained with fibrous porous grids having pore widths of up to 100μ, with the electrochemically active material being shaken, pasted or slurried onto the grid.

In alkaline cells, one of the most common active materials for the positive electrode is nickel/nickel hydroxide using, generally, one of the hydroxides of nickel in a higher valence state. The positive electrode, containing the nickel hydroxide, may be prepared essentially by two different methods, the so-called "wet" method and the "dry" method. According to the "wet" method, the porous electrode is filled with green nickel-II hydroxides by mechanical means, and then subjected to electrochemical oxidation or "forming" by charging the cathode against an inert or active electrode in an alkaline electrolyte. In this way a moist electrode, containing the active material in a still higher valence state, which at the same time is an effective depolarizer, is obtained.

In the so-called "dry" method the green nickel-II hydroxide is first chemically oxidized to black nickel-III hydroxide usually in solution, and the latter, after appropriate treatment including drying, is introduced in the dry state into the porous electrode grid. In this way a dry positive plate is obtained which can be used in alkaline cells against a suitable negative plate, such as cadmium/cadmium oxide or zinc/zinc oxide.

Experience has shown that the preparation of the positive plate containing the active nickel-III hydroxide by the "dry" method has many advantages over the "wet" method. Positive plates prepared by the "dry" method may be stored, in the absence of electrolyte, practically indefinitely, and are in a dry-charged state immediately ready for use against a suitable negative plate in the presence of an alkaline electrolyte (e.g. aqueous potassium hydroxide). Furthermore, in the case of electrode systems prepared by the "dry" method, the possibility of self-discharge, which constitutes a considerable hazard in the case of wet electrodes, cells or batteries stored in the wet state, is prevented.

According to the processes hitherto used for the so-called "dry" preparation of positive plates containing nickel-III hydroxide, the green nickel-II hydroxide is oxidized in an aqueous alkaline medium to black nickel-III hydroxide by means of chlorine gas or bromine water; the product is filtered, dried, pulverized, sieved, and the fraction comprising the particles of the desired diameter range is mechanically introduced into the porous grid structure. For the purposes of this application the term nickel-II will be used to identify the divalent or dipositive nickel (Ni++) and the term nickel-III to identify the higher valent state (Ni+++) in the compound, it being understood that there is some question as to the precise formula of the higher-valent compound; the latter is considered poorly characterized and may be a mixture of divalent and tetravalent nickel compounds, although applicant does not wish to be bound by any theories in the regard since, as will be evident hereinafter, the method of the invention may indeed give rise to a true compound of the trivalent nickel.

It has been found, however, that the oxidation of nickel-II hydroxide in an aqueous alkaline medium, for example in a solution of potassium hydroxide, by means of chlorine gas or bromine water, is a very cumbersome and time-consuming process which must be carried out with great care, and by means of which a 100% oxidation of nickel-II hydroxide to nickel-III hydroxide is not always possible unless special measures are taken. Furthermore, a considerable part of the oxidizing agent is converted into an essentially useless product. For example, since the oxidation of nickel-II hydroxide to nickel-III hydroxide in a potassium hydroxide solution, by means of chlorine gas takes place according to the equation

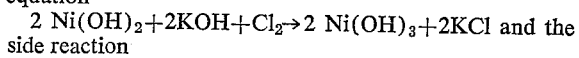

2 Ni(OH)$_2$+2KOH+Cl$_2$→2 Ni(OH)$_3$+2KCl and the side reaction

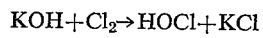

KOH+Cl$_2$→HOCl+KCl also presumably occurs; the oxidizing agent, i.e., chlorine, is partially converted to potassium chloride. Moreover, the reaction continuously removes hydroxyl ions from the solution, so that as the reaction progresses, the originally alkaline suspension becomes more and more neutral, then acid, which may result in the dissolution of the nickle-III hydroxide formed. Hence it is necessary to maintain the reaction mixture alkaline through the continuous addition of potassium hydroxide, an operation which further complicates the technique. Moreover, the HOCl appears to be the actual oxidant, which means about half of the chlorine is consumed uselessly. Furthermore, it is essential that the reaction mixture be efficiently cooled, since chlorine has the aforedescribed tendency to enter into an exothermic reaction with alkali hydroxides to form first hypochlorite, then at higher temperatures also chlorate and perchlorate. The formation of these side products is enhanced by catalytic effect of the nickel and the oxidizing power of the nickel-III hydroxide formed is partly used up in the process. Chlorate, especially, has a tendency to form in the presence of a local excess of this oxidizing agent. A further disadvantage of this process is that the final product is often contaminated with the alkali which is very difficult to remove by washing.

It is the principal object of the invention to provide an improved process for the production of higher valent nickel hydroxide, particularly for use in alkaline accumulators, as well as an improved electrode and method of making same whereby these disadvantages can be avoided.

These and other objects of the present invention are attained by the direct oxidation of nickel-II hydroxide with ozone in the gaseous state.

The method of oxidative preparation of nickel-III hydroxide from nickel-II hydroxide by direct ozone treatment of the lower-valent compound represents a considerable improvement over oxidation in an aqueous alkaline medium by means of chlorine gas or bromine water. With the use of the process of the present invention the formation of side products is prevented, and the necessity of using chemicals in addition to nickel-II hydroxide and the oxidizing agent is eliminated. Furthermore, the oxidizing power of the product is retained to an extent of nearly 100% even when an excess of the agent is used.

According to a feature of the present invention, green nickel-II hydroxide is treated, in the dry state, with an ozone-containing gas, at a temperature of between 20° and 110° C. In this process, a stream of ozone-containing gas is passed over nickel-II hydroxide, the latter having been prepared preferably by precipitation of a solution of a nickel salt with an alkali hydroxide and dried at 110–120° C. The oxidation of the dry nickel-II hydroxide by the ozone-containing gas has been found to take place readily at room temperature. However, in view of the increased reactivity of ozone with increasing temperature, the reaction may be carried out advantageously at a higher temperature, up to a maximum of 110–120° C. Higher temperatures should be avoided, since above 120° C. the green nickel-II hydroxide decomposes into a less hydrated greyish-green product; the preferred maximum has been found to be 110° C.

The oxidation reaction proceeds with great ease and at a fast rate. The green nickel-II hydroxide turns black after a very short time of exposure to the ozone-containing gas, and is completely converted into the substance which will be described as nickel-III hydroxide inasmuch as it has the stoichiometry attributable to this compound. The final product is stable and retains nearly 100% of its oxidizing power, even when prepared in the presence of excess ozone.

The ozone-containing gas employed in the present process may be a mixture of ozone and an inert gas, for example nitrogen, or one of the rare gases (e.g. helium, argon, neon, xenon), or a gaseous fluorocarbon such as one of the Freons and/or it may be prepared directly from air or oxygen by means of ultraviolet radiation. In the latter case the dry nickel-II hydroxide is directly exposed, for example, in an oxygen atmosphere, to intensive ultraviolet radiation.

In accordance with the preferred method forming the object of the present invention, the dry, finely divided nickel-II hydroxide to be oxidized is subjected, prior to exposure to the ozone-containing gas, to sieving in order to remove particles having a diameter greater than 80μ. This is expedient since the reaction of ozone with particles larger than this proceeds at a low rate and therefore the rapid and complete conversion of nickel-II hydroxide to nickel-III hydroxide is made difficult. Preferentially, the powdered nickel-II hydroxide is brought into intimate contact with the ozone-containing gas by means of whirling, mixing or vibration movements.

The process is a completely novel method of oxidative preparation a higher-valent compound suitable for alkaline accumulators from nickel-II hydroxide. In effect, all attempts to carry out the reaction under the same conditions as those used for the oxidation of nickel-II hydroxide in an aqueous medium, for example by means of chlorine gas, were unsuccessful. When nickel-II hydroxide is suspended in a neutral or alkaline medium and then exposed to a stream of dilute or concentrated ozone-containing gas, either no reaction takes place at all, or the extent of oxidation is minimal even after a long period of exposure to the gas. By contrast, when ozone-containing gas is passed over nickel-II hydroxide in the dry state, the oxidation is nearly complete in a relatively short time.

Thus the process is a novel and simplified method of oxidizing nickel-II hydroxide to nickel-III hydroxide. The product is not contaminated with undesirable side products or alkali, and hence requires no further purification. Since it is obtained in the dry state, it may be immediately introduced into the porous grid of electrodes to be used as positive plates in alkaline storage cells. In this way dry positive plates are obtained containing the higher-valent-nickel compound as an effective, reversibly operating depolarizer. Since the danger of self-discharge, which is always present in the case of moist electrodes, is ruled out, such dry plates are of particular usefulness in so-called dry-charged storage batteries which must be kept in readiness for the supply of power in emergencies, and which are pre-assembled in such a way as to be capable of supplying current immediately upon the application of the alkaline electrolyte.

The above and other objects, features and advantages of the present invention will become more readily apparent from the following description and specific example, reference being made to the accompanying drawing, in which.

Figure 1:
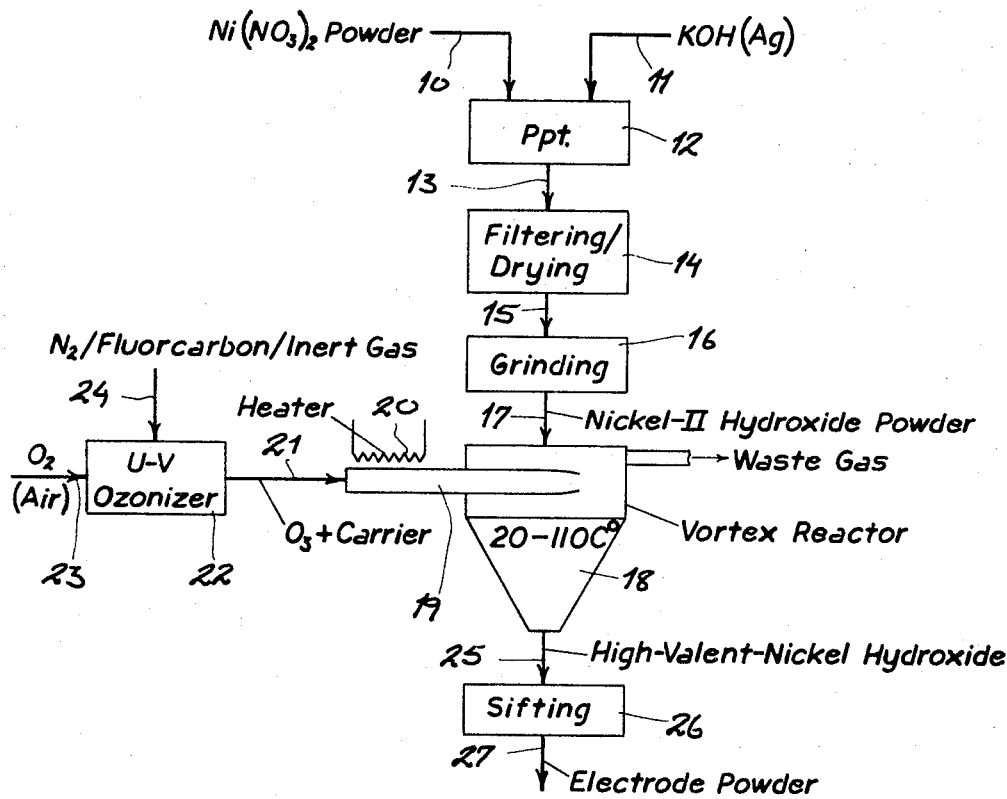
FIG. 1 is a flow diagram representing the process of the present invention.
Figure 2:
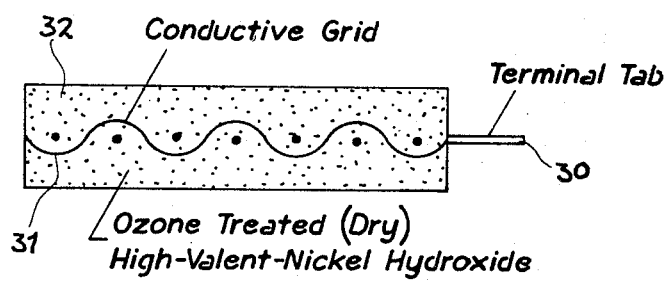
FIG. 2 is a cross-sectional view through an electrode of an alkaline accumulator according to this invention.

The trivalent-nickel hydroxide (hypothesized as $Ni(OH)_3$ or $NiOOH$) for the cathode of FIG. 2 can be prepared, in accordance with this invention, as diagrammatically illustrated in FIG. 1. Thus divalent nickel nitrate powder $(Ni(NO_3)_2 6H_2O)$ is introduced at 10 to a reaction vessel 12 supplied with aqueous potassium hydroxide or other alkaline solution at 11 and the precipitate is removed as indicated at 13. This precipitate consists of divalent-nickel hydroxide which is filtered and dried at 14 and fed at 15 to a grinding stage 16 in which a dried filtrate is comminuted to a sieve size less than that corresponding to about 80 microns particle diameter. The particle is then fed at 17 to a reaction vessel in which the particles are agitated in the presence of ozone. The reactor illustrated in FIG. 1 is of the vortex type and maintained at a temperature between 20° and 110° C. by a heater 20 along the gas-inlet line 19. Line 19 opens tangentially into the vortex reactor 18 in order to create a turbulent flow of gas and ensure the entrainment of the nickel-II hydroxide powder thereby. The ozone supplied to line 19 is admixed with a carrier and is fed via a conduit 21 from an ozonizer 22 in which a stream of oxygen or air from line 23 is subjected to high-intensity ultraviolet radiation. The inert gas, fluoro-carbon (e.g. Freon) or additional nitrogen can be supplied at 24 to the ozonizer, these carrier gases being substantially unaffected by the ozone developed in the ozonizer or the ultraviolet radiation to which the gas mixture is subjected. When the lower-valent nickel-hydroxide powder has substantially completely sustained the indicated color change from green to black, the reactor 18 is emptied and the higher-valent nickel hydroxide powder is delivered at 25 to a sifting stage 26 wherein particles above the desired size are removed. The sifting stage 26 is generally not required inasmuch as the grinding at stage 16 suffices to comminute the filtrate so that all of the particles treated in the reactor have a particle size of less than about 80 microns. The electrode powder removed in 27 can be directly packed onto a conductive grid 31 as indicated in FIG. 2 to which a terminal tab 30 has previously been soldered. The powder is indicated by the reference numeral 32. The electrode of FIG. 2 may be used in a dry-charged nickel-zinc or nickel-cadmium alkaline accumulator and can be stored for an almost unlimited duration without alteration in its characteristics. The discharge resulting from the electrode is substantially uniform to the characteristic sharp drop in the electrode potential.

EXAMPLE 180 g. of the nickel nitrate powder is reacted with a 28% aqueous solution of potassium hydroxide and the resulting nickel-II hydroxide powder is collected, filtered and dried. Approximately 90 g. of the dried powder, comminuted to a particle size of less than 80 microns, is introduced into the vortex reactor with an excess of ozonized air. The reaction is carried out at a temperature of about 100° C. for a reaction time of approximately 8 minutes and about 90 g. of black higher-valent product are recovered. The powder is pressed on to a conventional expanded-metal or screen grid and used in the usual manner in an alkaline accumulator.

The invention described and illustrated is believed to admit of many modifications within the ability of persons skilled in the art, all such modifications being considered within the spirit and scope of the appended claims.

I claim:

1. A process for the production of an electrochemically active mass for the cathode of an alkaline accumulator, comprising the step of treating dry nickel-II hydroxide with an ozone-containing gas stream at a temperature between substantially 20° C. and 110° C. and for a period sufficient to convert substantially all of said nickel-II hydroxide into a black mass of a higher oxidation state with an apparent formula of NiOOH.

2. The process defined in claim 1, further comprising the step of comminuting crystals of said nickel-II hydroxide to a maximum particle size of substantially 80 microns prior to treatment thereof with said ozone-containing gas stream.

3. The process defined in claim 1, further comprising the step of agitating said nickel-II hydroxide in said gas stream containing ozone.

4. The process defined in claim 3 wherein said gas stream consists in part of an inert gas carrier selected from the group which consists of nitrogen, rare gases and fluorocarbons.

5. The process defined in claim 4 wherein the ozone in said gas stream is formed by feeding oxygen to said gas stream and irradiating said gas stream with high-energy ultraviolet radiation.

6. The process defined in claim 1 wherein said gas stream is formed in situ by irradiating the dry nickel-II hydroxide in a blanket of an oxygen-containing gas with high-energy ultraviolet radiation.

7. The process defined in claim 1 which further comprises the step of pressing the black mass produced by treating said nickel-II hydroxide with ozone onto a conductive grid to form an electrode in a dry-charged state for use in a nickel-zinc or nickel-cadmium alkaline accumulator.

8. The process defined in claim 1 wherein the reaction between the ozone-containing gas stream and said nickel-II hydroxide is carried out in a gas vortex.

References Cited

UNITED STATES PATENTS

| | | | |
|---|---|---|---|
| 2,937,983 | 5/1960 | Ryan | 204—193 |
| 3,024,296 | 3/1962 | Adler | 136—24 |
| 3,230,113 | 1/1966 | Herold | 136—28 |

OTHER REFERENCES

Mellor, Comprehensive Treatise on Inorganic and Theoretical Chemistry, vol. 15, 1936, p. 386 relied on, copy available in Scientific Library QD 31 M4.

WINSTON A. DOUGLAS, *Primary Examiner.*

A. SKAPARS, *Assistant Examiner.*

U.S. Cl. X.R.

23—183